United States Patent
Takada

(10) Patent No.: US 12,022,346 B2
(45) Date of Patent: Jun. 25, 2024

(54) TERMINAL WITH INTERRUPT TIME DURING HANDOVER

(71) Applicant: NTT DOCOMO, INC., Tokyo (JP)

(72) Inventor: Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 166 days.

(21) Appl. No.: 17/635,229

(22) PCT Filed: Aug. 15, 2019

(86) PCT No.: PCT/JP2019/032080
§ 371 (c)(1),
(2) Date: Feb. 14, 2022

(87) PCT Pub. No.: WO2021/029079
PCT Pub. Date: Feb. 18, 2021

(65) Prior Publication Data
US 2022/0295370 A1  Sep. 15, 2022

(51) Int. Cl.
*H04W 36/18* (2009.01)
*H04L 27/26* (2006.01)
*H04W 36/00* (2009.01)

(52) U.S. Cl.
CPC ....... *H04W 36/18* (2013.01); *H04L 27/26025* (2021.01); *H04W 36/0061* (2013.01)

(58) Field of Classification Search
CPC ............. H04W 36/18; H04W 36/0061; H04W 36/0069; H04L 27/26025; H04L 5/0048; H04L 5/0064; H04L 5/001; H04L 5/0032; H04L 5/0023
See application file for complete search history.

(56) References Cited

U.S. PATENT DOCUMENTS

2017/0006507 A1  1/2017 Chapman et al.

FOREIGN PATENT DOCUMENTS

| WO | WO-2018142202 A1 * | 8/2018 | ......... H04L 27/0008 |
| WO | WO-2019106050 A1 * | 6/2019 | ............. H04L 5/001 |

OTHER PUBLICATIONS

3GPP TSG-RAN2 Meeting #106; R2-1905633 "Discussion on failure handling of handover for LTE mobility" OPPO; Reno, USA; May 13-17, 2018 (4 pages).
ETSI TS 136 133 V15.7.0 "LTE; Evolved Universal Terrestrial Radio Access (E-UTRA); Requirements for support of radio resource management (3GPP TS 36.133 version 15.7.0 Release 15)" Jul. 2019 (3602 pages).
3GPP TS 36.331 V15.6.0 "3rd Generation Partnership Project; Technical Specification Group Radio Access Network; Evolved Universal Terrestrial Radio Access (E-UTRA); Radio Resource Control (RRC); Protocol specification (Release 15)" Jun. 2019 (960 pages).
International Search Report issued in International Application No. PCT/JP2019/032080, mailed Mar. 17, 2020 (8 pages).

(Continued)

*Primary Examiner* — Marisol Figueroa
(74) *Attorney, Agent, or Firm* — Osha Bergman Watanabe & Burton LLP

(57) ABSTRACT

A terminal determines an interrupt time applied to a transition from a transition source cell to a transition destination cell. Specifically, the terminal changes a value of the interrupt time based on a combination of subcarrier spacings set in the transition source cell and the transition destination cell.

5 Claims, 7 Drawing Sheets

(56) References Cited

OTHER PUBLICATIONS

Written Opinion issued in International Application No. PCT/JP2019/032080; Dated Mar. 17, 2020 (5 pages).
Office Action issued in the counterpart Japanese Patent Application No. 2021-539803, mailed on Apr. 4, 2023 (7 pages).
Mediatek Inc.; "Source Cell Detaching for Minimizing User Data Interruption during HO"; 3GPP TSG RAN WG2 Meeting #105bis, R2-1903256; Xi'an, China; Apr. 8-12, 2019 (6 pages).
Nokia, Nokia Shanghai Bell; "On mobility enhancements during cell change"; 3GPP TSG RAN WG1 Meeting #96, R1-1903138; Athens, Greece; Feb. 25-Mar. 1, 2019 (4 pages).
Office Action issued in Chinese Application No. 201980099172.X; Dated Aug. 11, 2023 (14 pages).

* cited by examiner

TERMINAL WITH INTERRUPT TIME DURING HANDOVER

TECHNICAL FIELD

The present invention relates to a terminal that executes a transition to a transition destination cell such as handover.

BACKGROUND ART

The 3rd generation partnership project (3GPP) is progressing specification of long term evolution (LTE) and LTE-Advanced (hereinafter, referred to as LTE including LTE-Advanced) for the purpose of further speeding up the LTE, and specification of 5th generation mobile communication system (5G, referred to as new radio (NR) or next generation (NG)).

In the LTE, a function for reducing time during which data called Make Before Break cannot be transmitted/received in handover (transition) from a source cell (transition source cell) to a target cell (transition destination cell) is introduced (Non-Patent Literature 1).

The Make Before Break is referred to as a method of eliminating a route on an old side after establishing a new route in advance in switching routes accompanied by the handover.

Specifically, in the LTE, uplink (UL) and downlink (DL) continue in a source cell until the handover of the terminal (user equipment (UE)) to the target cell is completed, while being limited to intra-frequency.

Further, in the LTE, a handover delay ($D_{handover}$) from reception of a handover command by the terminal to a start of a physical random access channel (PRACH) transmission is defined.

The $D_{handover}$ is defined as a maximum delay (maximum RRC procedure delay) due to a procedure of a radio resource control layer (RRC) to which a predetermined interrupt time ($T_{interrupt}$) is added (Non-Patent Literature 2). In the Make Before Break handover of the LTE, the $T_{interrupt}$ is defined as 5 ms while being limited to the intra-frequency.

CITATION LIST

Non-Patent Literature

Non-Patent Literature 1: 3GPP TS 36.331 V15.6.0, 3rd Generation Partnership Project; Technical Specification Group Radio Access Network; Evolved Universal Terrestrial Radio Access (E-UTRA); Radio Resource Control (RRC); Protocol specification (Release 15), 3GPP, June, 2019

Non-Patent Literature 2: 3GPP TS 36.133 V15.7.0, 3rd Generation Partnership Project; Technical Specification Group Radio Access Network; Evolved Universal Terrestrial Radio Access (E-UTRA); Requirements for support of radio resource management (Release 15), 3GPP, June, 2019

SUMMARY OF INVENTION

Also in the 5G (NR), application of the Make Before Break handover and a secondary cell group (SCG) by the Make Before Break, specifically, application of a change in SeNB/SgNB (called Make Before Break SCG) has been studied. However, in the 5G, not only the handover to the intra-frequency but also the handover to the target cell (transition destination cell) of different subcarrier spacing (SCS), an inter-frequency, or an inter-frequency range (FR) is assumed.

For this reason, it is difficult to follow the procedure related to the Make Before Break of the LTE as it is.

Therefore, the present invention has been made in view of such a situation, and an object of the present invention is to provide a terminal capable of realizing more appropriate transition even when a configuration of a transition source cell and a transition destination cell may be different.

According to an aspect of the present disclosure, a terminal (UE 200) includes a control unit (handover control unit 230) that determines an interrupt time applied to a transition from a transition source cell to a transition destination cell, in which the control unit changes a value of the interrupt time based on a combination of subcarrier spacings set in the transition source cell and the transition destination cell.

According to an aspect of the present disclosure, a terminal (UE 200) includes a control unit (CA control unit 240) that executes carrier aggregation using a plurality of component carriers, in which the control unit continues communication with a transition source cell by the carrier aggregation during a transition when a transition method (Make Before Break) that maintains a radio link with the transition source cell during the transition is configured.

According to an aspect of the present disclosure, a terminal (UE 200) includes a control unit that executes a transition to a transition destination cell according to a transition method (Make Before Break) of maintaining a radio link with a transition source cell during transition, in which the control unit continues radio link monitoring in the transition source cell during the transition to the transition destination cell according to the transition method.

DESCRIPTION OF EMBODIMENTS

Figure 1:
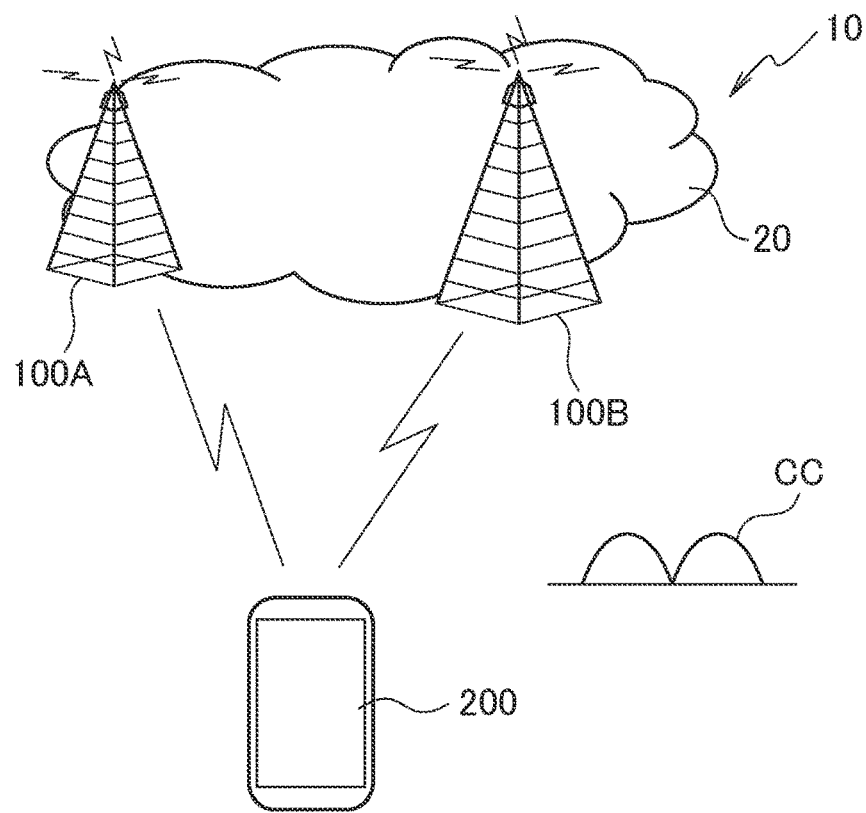
FIG. 1 is an overall schematic configuration diagram of a radio communication system 10.

Hereinafter, embodiments will be described with reference to the drawings. Note that the same functions or configurations will be denoted by the same or similar reference numerals, and a description thereof will be appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G new radio (NR), and includes a next generation-radio access network 20 (hereinafter, referred to as NG-RAN 20) and a user terminal 200 (hereinafter, referred to as UE 200).

The NG-RAN 20 includes radio base stations 100A and 100B (hereinafter, referred to as gNB 100A and gNB 100B, respectively). Note that a specific configuration of the radio communication system 10 including the numbers of gNBs and UEs is not limited to an example illustrated in FIG. 1.

The NG-RAN 20 actually includes a plurality of NG-RAN nodes, specifically, gNBs (or ng-eNBs), and is connected to a 5G core network (5GC) (not illustrated). Note that the NG-RAN 20 and the 5GC may be simply expressed as networks.

The gNBs 100A and 100B are 5G radio base stations, and execute 5G radio communication with the UE 200. The gNBs 100A and 100B and the UE 200 can support massive multiple-input multiple-output (MIMO) that generates beams with higher directivity, carrier aggregation (CA) that bundles and uses a plurality of component carriers (CCs), dual connectivity (DC) that simultaneously performs communication between the UE and each of a plurality of NG-RAN nodes, and the like, by controlling radio signals transmitted from a plurality of antenna elements.

In addition, in the present embodiment, Make Before Break that can reduce time during which data cannot be transmitted and received when the UE 200 transits the cell formed by the gNBs 100A and 100B is introduced.

The Make Before Break is a transition method of eliminating a route on an old side after establishing a new route in advance in switching routes accompanied by the handover. Alternatively, the Make Before Break may be interpreted as a method of maintaining a radio link with a source cell (may be referred to as a transition source cell) during the transition of the UE 200.

In addition, the Make Before Break may indicate that the UE continues uplink (UL) transmission and/or downlink (DL) reception in a source cell before executing a first transmission to a targeted intra-frequency primary cell (PS-Cell) via a physical random access channel (PRACH), or before executing an initial physical uplink shared channel (PUSCH) transmission to a targeted PCell in the intra-frequency (when rack-Skip is configured).

When the Make Before Break handover is configured, the connection to the source cell is maintained before the UE 200 performs an initial UL transmission to the target cell after receiving a radio resource control layer (RRC) connection reconfiguration (RRC connection reconfiguration) message including mobilityControlInformation.

Furthermore, in this embodiment, a change in a secondary cell group (SCG) by the Make Before Break (Make Before Break SCG) is also introduced. The Make Before Break SCG can reduce the time during which data cannot be transmitted/received, like the Make Before Break handover. The Make Before Break SCG may indicate that the UE continues UL transmission/DL reception in the source cell before executing the first transmission to the targeted intra-frequency primary SCell (PSCell) via the PRACH or before executing an initial PUSCH transmission to the target intra-frequency PSCell (when rach-SkipSCG is configured).

In this way, the Make Before Break handover and the Make Before Break SCG continue the UL transmission/DL reception in the source cell until the transition to the target cell is completed.

(2) Functional Block Configuration of Radio Communication System

Figure 2:
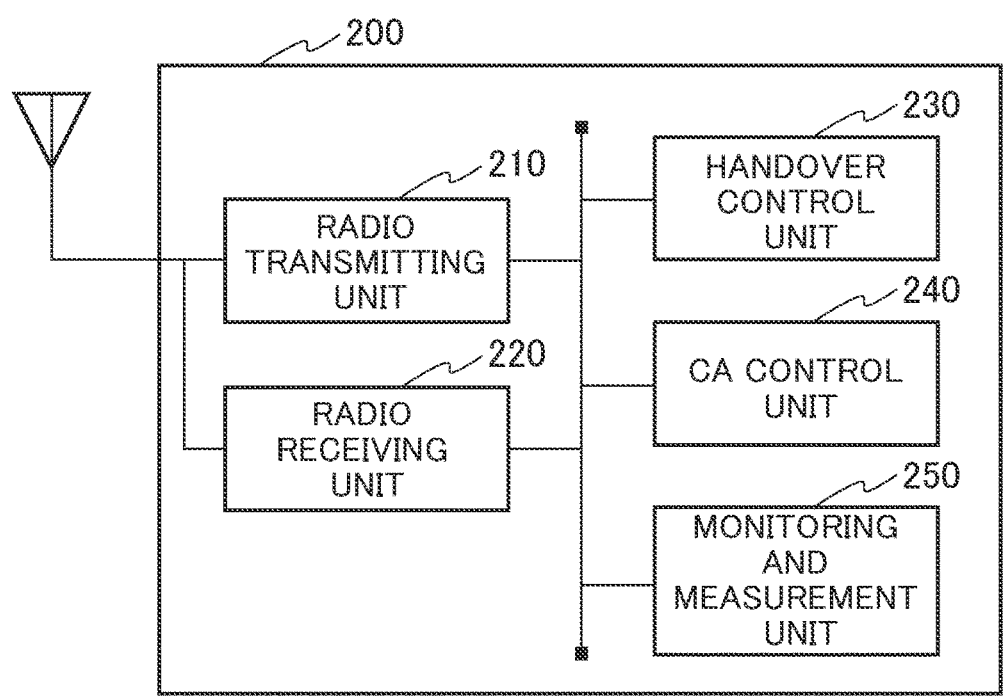
FIG. 2 is a functional block configuration diagram of a UE 200.

Next, a functional block configuration of the radio communication system 10 will be described. Specifically, a functional block configuration of the UE 200 will be described. FIG. 2 is the functional block configuration diagram of the UE 200.

A radio transmitting unit 210 transmits an uplink signal (UL signal) according to the NR. A radio receiving unit 220 receives a downlink signal (DL signal) according to the NR.

Specifically, the radio transmitting unit 210 and the radio receiving unit 220 execute radio communication via a control channel or a data channel.

The control channel includes a physical downlink control channel (PDCCH), a physical uplink control channel (PUCCH), a physical random access channel (PRACH), a physical broadcast channel (PBCH), and the like.

In addition, the data channel includes a physical downlink shared channel (PDSCH), a PUSCH, and the like.

The reference signal includes a demodulation reference signal (DMRS), a sounding reference signal (SRS), a phase tracking reference signal (PTRS), and a channel state information-reference signal (CSI-RS). In addition, a signal can include a channel and a reference signal. In addition, the data may mean data transmitted via the data channel.

A handover control unit 230 controls the handover of the UE 200. In particular, in the present embodiment, the handover control unit 230 determines an interrupt time ($T_{interrupt}$) applied to the transition from the source cell (transition source cell) to the target cell (transition destination cell). In the present embodiment, the handover control unit 230 constitutes the control unit that determines the interrupt time.

Specifically, the $T_{interrupt}$ is used to calculate a handover delay ($D_{handover}$) from the reception of the handover command by the UE 200 to a start of PRACH transmission. Note that the relationship between the $D_{handover}$ and the $T_{interrupt}$ will be described later.

More specifically, the handover control unit 230 can change a value of $T_{interrupt}$ based on the combination of the subcarrier spacings (SCSs) set in the transition source cell and the transition destination cell. Note that the SCS may be interpreted as numerology. The numerology is defined in 3GPP TS38.300 and corresponds to one subcarrier spacing in a frequency domain.

Further, the SCS may be replaced with a length of a slot forming a radio frame, as described later. This is because the length of the slot becomes shorter as the SCS becomes larger. It is assumed that one slot is composed of 14 symbols, but the number of symbols (may be referred to as OFDM symbols) included in the slot may be 14 or more (for example, 28).

Alternatively, the handover control unit 230 may change the value of $T_{interrupt}$ based on a combination of frequencies of the transition source cell and the transition destination cell and the subcarrier spacings.

Further, the handover control unit 230 performs the transition to the transition destination cell according to the Make Before Break during which the radio link with the transition source cell is maintained during the transition of the UE 200.

In the present embodiment, the handover control unit 230 continues radio link monitoring (RLM) in the transition source cell during the transition to the transition destination cell according to the Make Before Break (including Make Before Break SCG, the same applies to the following).

Specifically, the handover control unit 230 instructs a monitoring and measurement unit 250 to perform the RLM during the transition.

A CA control unit 240 performs control related to carrier aggregation (CA). In the present embodiment, the CA control unit 240 constitutes a control unit that executes CA using a plurality of component carriers (CCs).

Specifically, when the Make Before Break is configured, the CA control unit 240 can continue communication with the transition source cell by the CA during the transition of the UE 200 by the Make Before Break.

The monitoring and measurement unit 250 performs radio link monitoring and processing related to measurement in each layer. The radio link monitoring (RLM) corresponds to radio link monitoring defined in 3GPP TS38.133. Specifically, the RLM may include the following monitoring:

Primary Cell (PCell) of stand-alone NR, NR-NR dual connectivity (NR-DC), and NR-E-UTRA dual connectivity (NE-DC) operation mode Primary SCell (PSCell) of NR-DC and E-UTRA-NR dual connectivity (EN-DC) operation mode Further, the monitoring and measurement unit 250 performs measurement of reception quality such as measurement of reference signal received power (RSRP) in layer 1 (L1) or layer 3.

(3) Operation of Radio Communication System

Next, an operation of the radio communication system 10 will be described. Specifically, an operation related to cell transition by the Make Before Break (which may include the Make Before Break SCG) by the UE 200 will be described.

(3.1) Transition of UE 200 by Make Before Break

First, the sequence of the Make Before Break handover will be described while comparing with normal handover.

Figure 3:
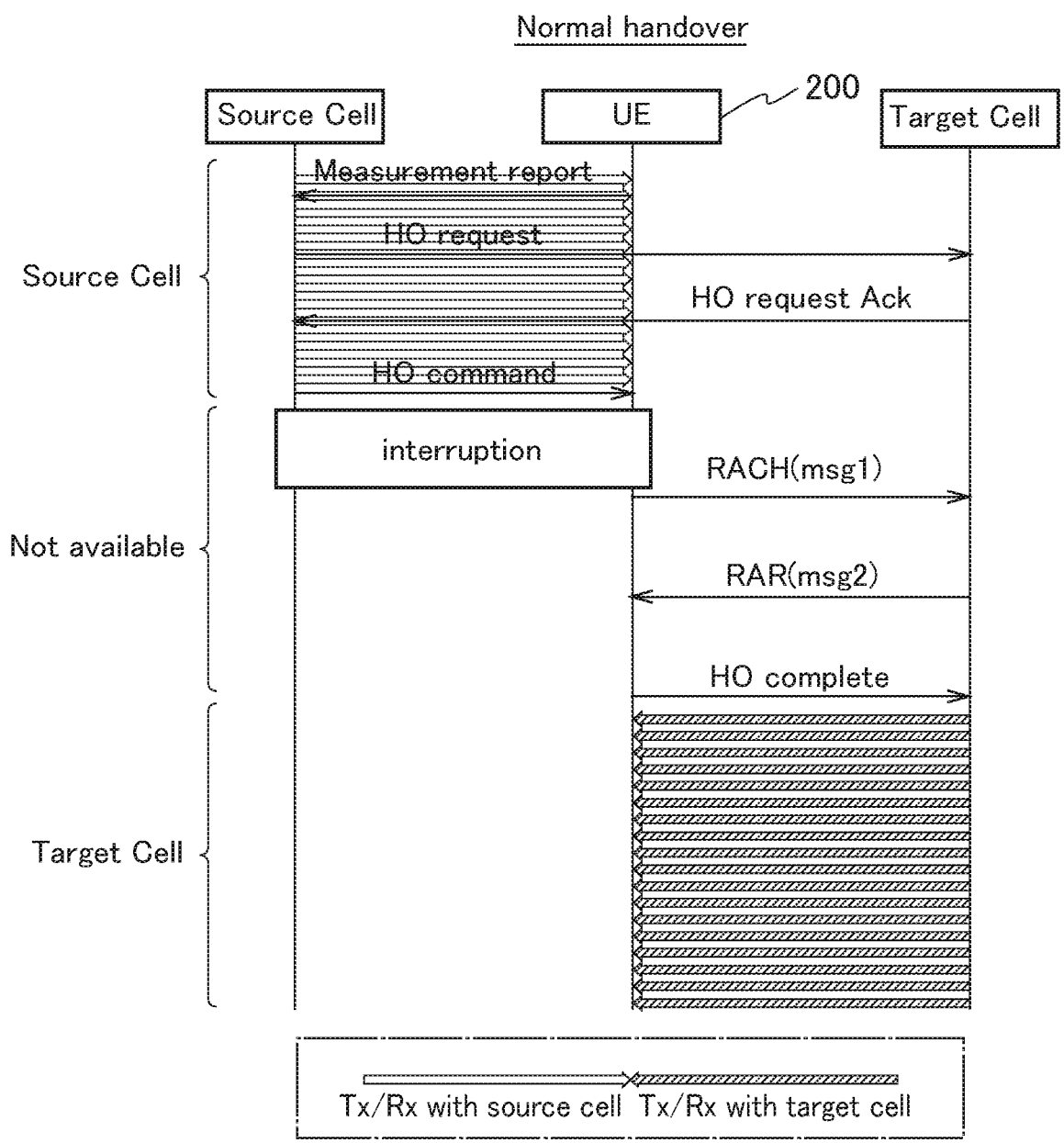
FIG. 3 is a diagram illustrating a sequence example of normal handover.
Figure 4:
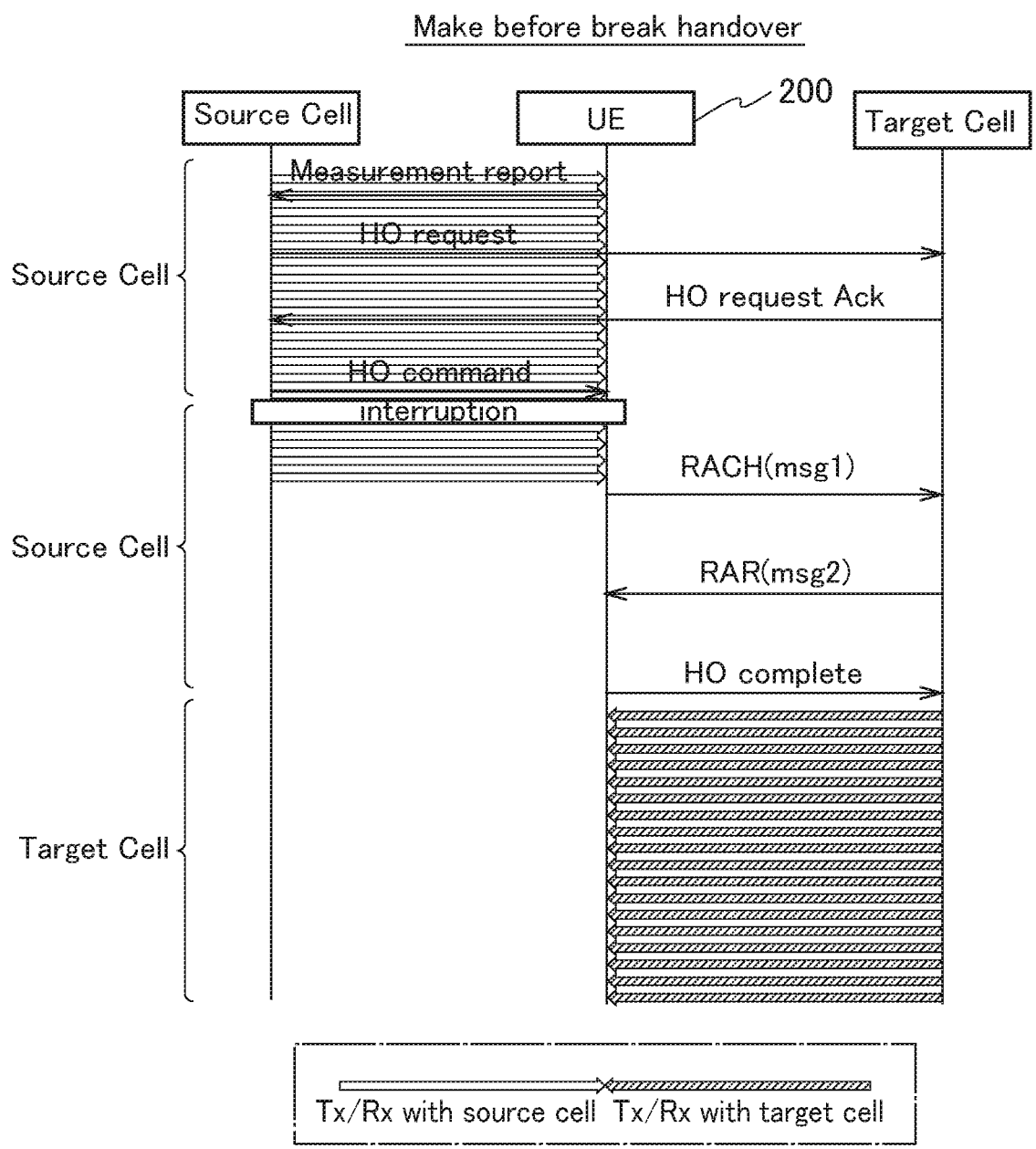
FIG. 4 is a diagram illustrating a sequence example of Make Before Break handover.

FIG. 3 illustrates a sequence example of normal handover. FIG. 4 illustrates a sequence example of the Make Before Break handover.

As illustrated in FIG. 3, in the normal handover, a certain time (interruption in FIG. 3) during which data cannot be transmitted and received until a start of transmission of a random access channel (RACH) to the target cell after the UE 200 receives the handover command from the source cell occurs.

On the other hand, as illustrated in FIG. 4, in the Make Before Break handover, the UL/DL transmission to the source cell continues even after the handover command is received, so the time during which data cannot be transmitted and received (interruption in FIG. 4) may be shortened. Further, in the case of the Make Before Break SCG, the handover command is a command for SeNB/SgNB change, but the operation of the UE 200 is the same as the sequence illustrated in FIG. 4.

Regarding the handover in the LTE, the following contents are defined in chapter 5 in 3GPP TS36.331.

(i) Handover delay (from reception of handover command to start of RACH transmission)

$$D_{handover} = \text{the maximum RRC procedure delay} + T_{interrupt}$$

(ii) Interrupt time (time during which data cannot be transmitted and received during the handover operation)

$$T_{interrupt} = T_{search} + T_{IU} + 20 \text{ ms}$$

$T_{search}$: Time required for automatic gain control (AGC) configuration and detection of primary synchronization signal/secondary synchronization signal (PSS/SSS) of target cell $T_{IU}$: Interruption uncertainty time (time including uncertainty factors such as PRACH transmission timing)

20 ms: Another margin, and including switching processing time required for UE, warm-up period of radio frequency (RF) part, and the like Note that in the Make Before Break handover, the $T_{interrupt}$ is defined as 5 ms. In this case, the operation itself performed by the UE 200 does not change during the above $T_{search} + T_{IU} + 20$ ms, but since the connection with the source cell can be maintained, the time during which data cannot be transmitted and received is shortened.

However, since an on/off of an RF circuit and a gain control of signal reception occur, the interrupt time accompanied thereby is added. The 5 ms of the $T_{interrupt}$ is cited from the provision of interruption at the time of intra-band SCell addition/activation defined in chapter 7 in 3GPP TS36.133. As described above, the Make Before Break handover of the LTE is limited to a handover on the intra-frequency (may be interpreted as the intra-frequency band), and thus 5 ms is defined.

On the other hand, in the case of the 5G (NR), it is necessary to consider the following points.

Configuration of $D_{handover}$ and $T_{interrupt}$

Handover to the intra-frequency

Handover to the inter-frequency

Inter-FR Handover (for example, FR1 to FR2, and the like)

When a handover instruction (command) is received during the execution of the carrier aggregation.

Measurement operation at the source cell during the Make Before Break handover (radio link monitoring (RLM) and the like)

Note that in the 5G, $D_{handover}$ and $T_{interrupt}$ are defined as follows.

$$D_{handover} = \text{the maximum RRC procedure delay} + T_{interrupt}$$

$$T_{interrupt} = T_{search} + T_{IU} + T_{processing} + T_\Delta \text{ ms}$$

$T_{search}$: Time required for AGC configuration and PSS/SSS detection of the target cell In the case of the known cell, the time is 0 ms, and in the case of the unknown cell, the time is $T_{rs}+2$ ms for ntra-freq·3*$T_{rs}+2$ ms for inter-freq.

$T_{IU}$: Interruption uncertainty time (time including uncertainty factors such as PRACH transmission timing)

$T_{processing}$: 20 ms or 40 ms, and 40 ms in the case of FR2. A switching processing time required for the UE, a warm-up period of the radio frequency (RF) part, and the like are included.

$T_\Delta$: Tracking and acquisition time of all timing information of the target cell. $T_\Delta = T_{rs}$.

$T_{rs}$: SSB based RRM measurement timing configuration window (SMTC) period of the target cell (NR)

(3.2) Operation Example

Next, an example of an operation related to the cell transition by the Make Before Break (including the Make Before Break SCG, the same applies to the following) described above will be described.

Specifically, the operation of determining the $D_{handover}$ and the $T_{interrupt}$ by the UE 200, the operation when the handover instruction (command) is received during the execution of the carrier aggregation, and the measurement operation during the transition by the Make Before Break will be described.

(3.2.1) Operation Example 1

Figure 5:
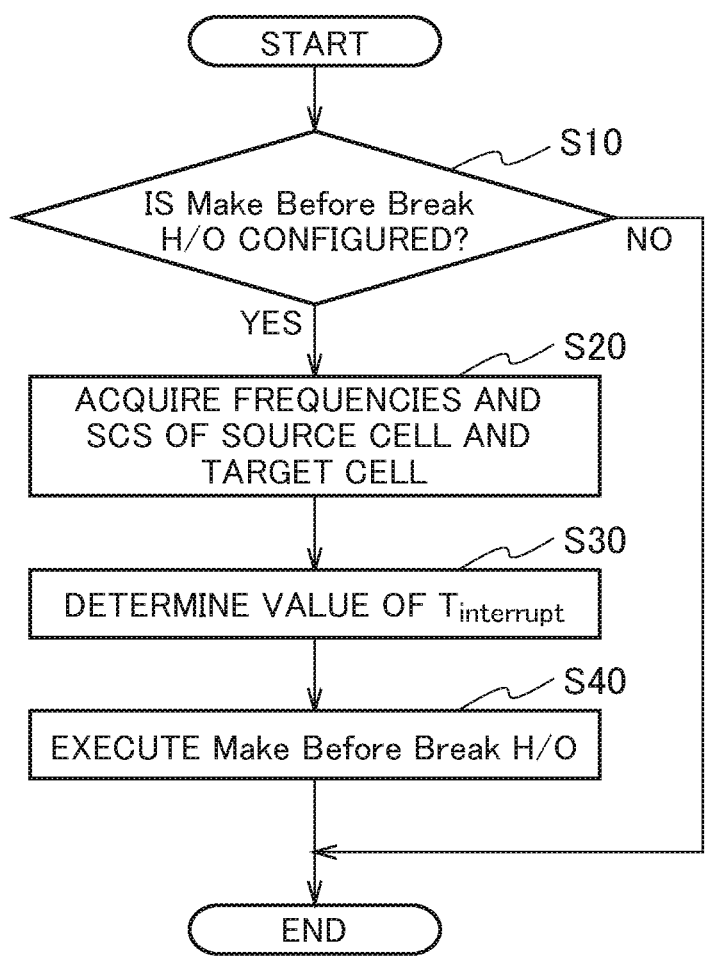
FIG. 5 is a diagram illustrating an execution flow of the Make Before Break handover of the UE 200 according to operation example 1.

In this operation example, the operation of determining the $D_{handover}$ and the $T_{interrupt}$ by the UE 200 will be described. FIG. 5 is a diagram illustrating an execution flow of the Make Before Break handover of the UE 200 according to the operation example 1.

As illustrated in FIG. 5, the UE 200 determines whether or not the Make Before Break handover (H/O) is configured (S10). Specifically, the UE 200 can recognize that the Make Before Break handover is configured by signaling and the like of an upper layer (for example, RRC).

Note that when the configuration of the Make Before Break handover is fixed in advance in the radio communication system 10, the UE 200 may implicitly recognize the configuration.

When the Make Before Break handover is configured, the UE 200 acquires the frequencies and the subcarrier spacings (SCSs) of the source cell and the target cell (S20). Note that the UE 200 does not necessarily acquire both the frequency and the SCS, and may acquire only the SCS.

The UE 200 determines a value of the $T_{interrupt}$ based on at least the combination of the SCSs of the source cell and the target cell among the acquired frequencies and SCSs (S30). Note that a specific example of determining the $T_{interrupt}$ will be described later.

The UE 200 executes the Make Before Break handover while using the $D_{handover}$ to which the determined $T_{interrupt}$ is applied (S40).

In this way, in this operation example, the $T_{interrupt}$ is not fixed but variable. As described above, the $T_{interrupt}$ changes according to the combination of the frequency and the SCS between the source cell and the target cell (victim cell).

Tables 1 and 2 show combinations of a slot length, SCS, and an interruption length used for determining the value of the $T_{interrupt}$

TABLE 1

| u | NR Slot length (ms) of victim cell | SCS of Source cell | Interruption length(slot) |
|---|---|---|---|
| 0 | 1 | 15 | 1 |
| 1 | 0.5 | 30 | 2 |
| 2 | 0.25 | 60 | 4 or 5*[1] |
| 3 | 0.125 | 120 | 8 or 9*[2] |

*[1]If FR2-FR2, 4/If FR1-FR2, 5
*[2]If FR2-FR2, 8/If FR1-FR2, 9

TABLE 2

| u | NR Slot length (ms) | SCS of Source cell | Interruption length (slot) |
|---|---|---|---|
| 0 | 1 | 15 | 1 + $T_{SMTC\_duration}$ |
| 1 | 0.5 | 30 | 2 + $T_{SMTC\_duration}$ |
| 2 | 0.25 | 60 | 4 + $T_{SMTC\_duration}$ |
| 3 | 0.125 | 120 | 8 + $T_{SMTC\_duration}$ |

Note:
Duration of SMTC with $T_{SMTC\_duration}$ configured

Specifically, Table 1 is for inter-band handover, and Table 2 is for intra-band handover within the intra-frequency band. Tables 1 and 2 correspond to tables in chapter 8.2.2 in 3GPP TS38.133.

An interruption length (slot) shown in Table 1 and Table 2 corresponds to the value of the $T_{interrupt}$ The Interruption length (slot) is indicated by the slot length with the SCS as a reference, and thus is converted into time (ms). Note that Table 2 may be interpreted as being applied to SCell addition (that is, Make Before Break SCG).

Further, in the case of this operation example, the following additional operation (processing) may be added.

The applied regulations may be different between the Intra-frequency handover and the inter-frequency handover.

Different regulations may be applied depending on the combination of the SCSs of the source cell and the target cell The applied regulations may be different in the handover within the FR and the handover between the FRs (FR1 and FR2).

Also, the existing regulations such as chapter 8.2.2 in 3GPP TS38.331 described above may be referred to.

(3.2.2) Operation Example 2

In this operation example, the operation when the UE 200 receives a handover command during the execution of the carrier aggregation will be described. Hereinafter, the description of the same parts as those in the operation example 1 described above will be appropriately omitted.

Figure 6:
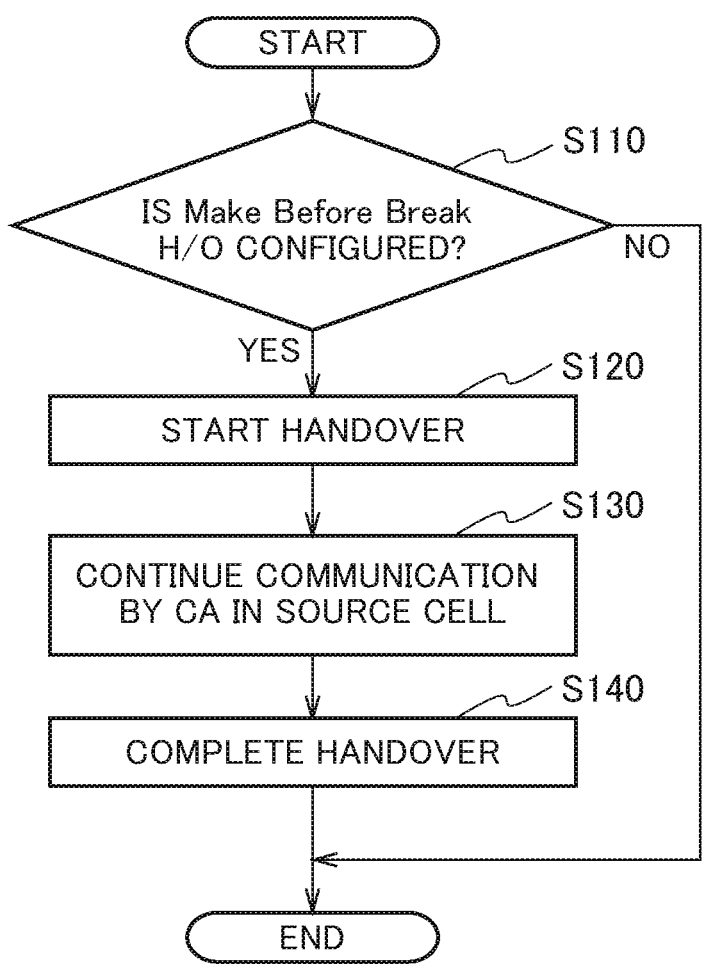
FIG. 6 is a diagram illustrating an execution flow of the Make Before Break handover of the UE 200 according to operation example 2.

FIG. 6 is a diagram illustrating an execution flow of the Make Before Break handover of the UE 200 according to the operation example 2. As illustrated in FIG. 6, the UE 200 determines whether or not the Make Before Break handover (H/O) is configured (S110).

In addition, here, it is assumed that the UE 200 is executing the carrier aggregation (CA) with the gNB 100A (or gNB 100B).

In such a state, the UE 200 receives the handover command from the gNB 100A and starts the Make Before Break handover (S120).

The UE 200 continues the communication by the source cell and the CA during the transition (during the handover) to the target cell by the Make Before Break (S130). Note that in this case, it is not necessary to release the SCell of the source cell in advance.

The UE 200 performs the handover processing with the target cell and completes the handover (S140).

(3.2.3) Operation Example 3

In this operation example, the measurement operation during the transition by the Make Before Break of the UE 200 will be described.

Figure 7:
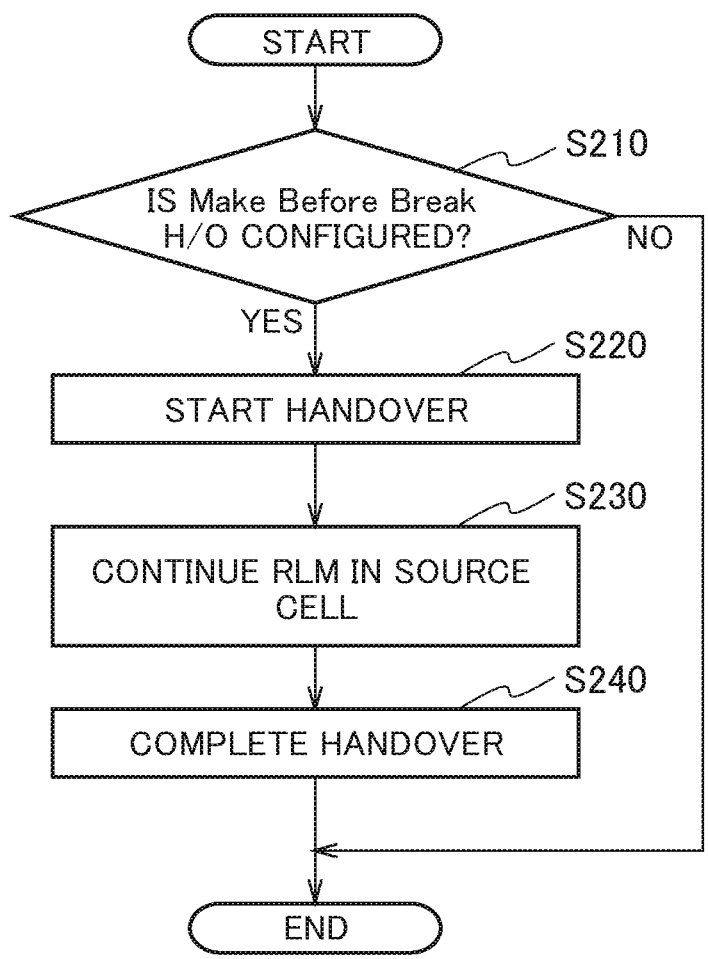
FIG. 7 is a diagram illustrating an execution flow of Make Before Break handover of the UE 200 according to operation example 3.

FIG. 7 is a diagram illustrating an execution flow of the Make Before Break handover of the UE 200 according to the operation example 3. As illustrated in FIG. 7, the UE 200 determines whether or not the Make Before Break handover (H/O) is configured (S210).

The UE 200 receives the handover command from the gNB 100A and starts the Make Before Break handover (S220).

The UE 200 continues the radio link monitoring (RLM) in the source cell during the transition (during the handover) to the target cell by the Make Before Break (S230).

The UE 200 performs the handover processing with the target cell and completes the handover (S240).

Note that when the radio link failure (RLF) is detected on the source cell side until the handover (cell switching) to the target cell is completed, the UE 200 may interrupt the communication via the source cell depending on the timing when the RLF has been detected. Note that even if the RLF is detected in this way, the handover may continue, or RRC re-establishment to the source cell may be executed and thus the handover maybe be stopped.

(3.3) Modified Examples

Furthermore, the operation examples described above may be modified as follows.

In addition to handover, all or part of the operation examples described above may be applied to the PSCell addition for dual connectivity (DC) or the PSCell change during the DC execution.

All or part of the operation examples described above may be applied to the handover other than the Make Before Break or a procedure of making PS Cell addition/change efficient.

For example, there is a procedure of maintaining a control plane (C-plane) connection with the source cell.

Further, the operation examples 1 to 3 described above may be compositely executed in combination.

(4) Action and Effect

According to the embodiment described above, the following effects can be obtained. Specifically, the UE 200 can determine the interrupt time ($T_{interrupt}$) applied to the transition from the source cell (transition source cell) to the target cell (transition destination cell). More specifically, the UE 200 can change the value of $T_{interrupt}$ based on the combination of the subcarrier spacings (SCS) set in the transition source cell and the transition destination cell.

Therefore, the UE200 can realize more appropriate handover (transition) even when executing the handover to the target cell (transition destination cell) of the different subcarrier spacings (SCSs), the different inter-frequency, or the different inter-frequency range (FR).

In the present embodiment, the UE 200 can also change the value of the $T_{interrupt}$ based on the combination of the frequencies of the transition source cell and the transition destination cell and the subcarrier spacings. Therefore, more appropriate handover (transition) can be realized according to the characteristics of the transition source cell and the transition destination cell.

In addition, the UE 200 can continue communication with the transition source cell by the CA during the transition of the UE 200 by the Make Before Break. Therefore, it is easy to secure high throughput even during the transition of the UE 200 by the Make Before Break.

Furthermore, the UE 200 can also continue the radio link monitoring (RLM) in the transition source cell during the transition to the transition destination cell according to the Make Before Break. Therefore, it is easy to maintain the quality of the radio link even during the transition of the UE 200 by the Make Before Break.

According to such an operation of the UE 200, more appropriate handover (transition) can be realized.

(5) Other Embodiments

Although the contents of the present invention have been described hereinabove with reference to the embodiments, it is obvious to those skilled in the art that the present invention is not limited to these descriptions, and can be variously modified and improved.

For example, in the embodiment described above, the Make Before Break handover (including the Make Before Break SCG) in the 5G (NR) is described as an example, but the operation examples described above are partially or entirely applied to the LTE when appropriate. Furthermore, the operation examples described above may be applied to Beyond 5G and the like, and are not limited to application to 5G.

Further, in the embodiment described above, the $T_{interrupt}$ is changed, and as a result, the value of the $D_{handover}$ changes, but for example, the $D_{handover}$ may be directly changed instead of the $T_{interrupt}$.

In addition, the configuration diagram (FIG. 2) used for explaining the embodiment described above illustrates blocks of functional unit. Those functional blocks (components) can be realized by a desired combination of at least one of hardware and software. A method for realizing each functional block is not particularly limited. That is, each functional block may be realized by one device combined physically or logically. Alternatively, two or more devices separated physically or logically may be directly or indirectly connected (for example, wired, or wireless) to each other, and each functional block may be realized by these plural devices. The functional blocks may be realized by combining software with the one device or the plural devices mentioned above.

Functions include determining, determining, judging, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (component) that causes transmitting may be called a transmitting unit or a transmitter. For any of the above, as described above, the realization method is not particularly limited to any one method.

Figure 8:
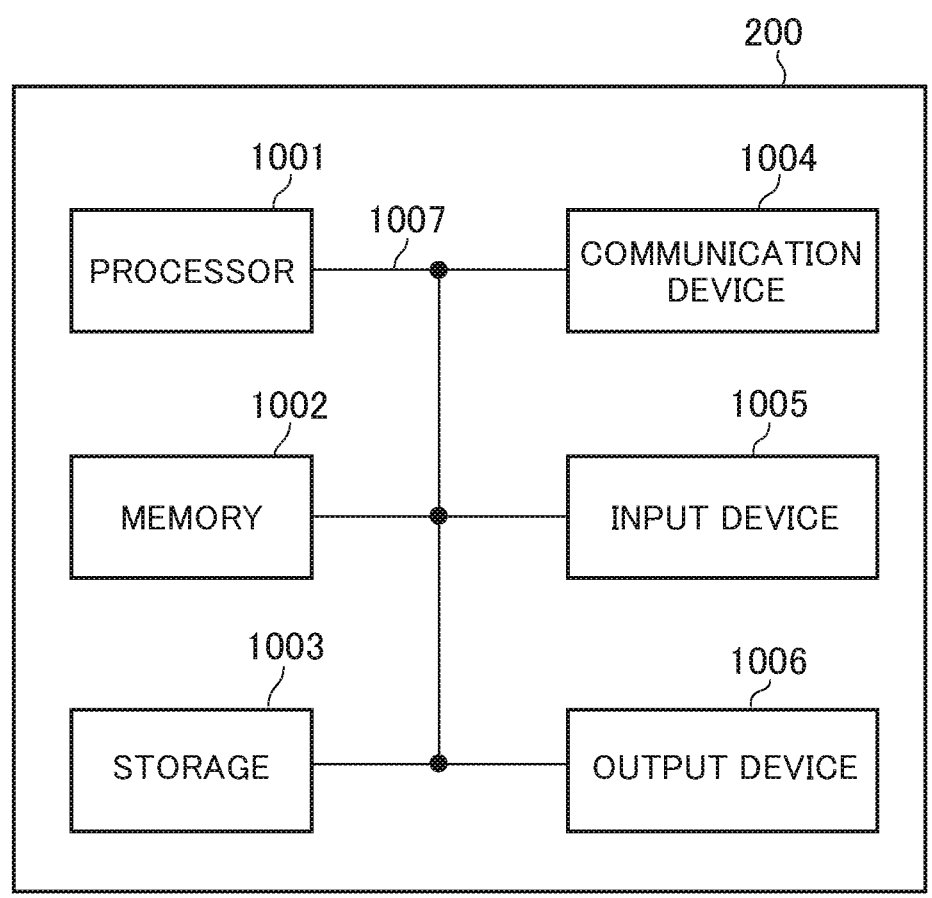
FIG. 8 is a diagram illustrating an example of a hardware configuration of the UE 200.

Furthermore, the above-described UE 200 can function as a computer that performs the processing of the radio communication method of the present disclosure. FIG. 8 is a diagram illustrating an example of a hardware configuration of the UE 200. As illustrated in FIG. 8, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted without including a part of the devices.

The functional blocks (see FIG. 2) of the UE 200 can be realized by any of hardware elements of the computer device or a desired combination of the hardware elements.

In addition, each function of the UE 200 is realized by causing the processor 1001 to perform computing by loading predetermined software (program) on the hardware such as the processor 1001 and the memory 1002, controlling communication by the communication device 1004, and controlling at least one of reading and writing of data on the memory 1002 and the storage 1003.

The processor 1001, for example, operates an operating system to control the entire computer. The processor 1001 can be configured with a central processing unit (CPU) including an interface with a peripheral device, a control device, a computing device, a register, and the like.

Moreover, the processor 1001 reads a program (program code), a software module, data, and the like from the storage 1003 and/or the communication device 1004 into the memory 1002, and executes various processes according to the data. As the program, a program that is capable of executing on the computer at least a part of the operation described in the above embodiments is used. Alternatively, various processes described above can be executed by one processor 1001 or can be executed simultaneously or sequentially by two or more processors 1001. The processor 1001 can be implemented by using one or more chips. Alternatively, the program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory, and the like. The memory 1002 can store therein a program (program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these hardware.

Notification of information is not limited to that described in the above aspect/embodiment, and may be performed by using a different method. For example, the notification of information may be performed by physical layer signaling (for example, Downlink Control Information (DCI), Uplink Control Information (UCI), upper layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the above aspects/embodiments can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G) to be applied.

As long as there is no inconsistency, the order of processing procedures, sequences, flowcharts, and the like of each of the above aspects/embodiments in the present disclosure may be exchanged. For example, the various steps and the sequence of the steps of the methods described above are exemplary and are not limited to the specific order mentioned above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from an upper layer (or lower layer) to a lower layer (or upper layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, and it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, fiber optic cable, twisted pair, Digital Subscriber Line (DSL), or the like) and a wireless technology (infrared light, microwave, or the like), then at least one of these wired and wireless technologies is included within the definition of the transmission medium.

Information, signals, or the like mentioned above may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in this disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like described in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (remote radio head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows communication between a base station and a mobile station to be replaced with a communication between a plurality of mobile stations (for example, may be referred to as device-to-device (D2D), vehicle-to-everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

The radio frame may be composed of one or a plurality of frames in the time domain. One frame or each of the plurality of frames in the time domain may be referred to as a subframe.

The subframe may be composed of one or a plurality of slots in the time domain. The subframe may also be a fixed time length (for example, 1 ms) that does not depend on numerology.

The numerology may be a communication parameter applied to at least one of transmission and reception of a certain signal or channel. The numerology may indicate at least one of, for example, subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, specific windowing processing performed by a transceiver in a time domain, and the like.

The slot may be composed of one or a plurality of symbols (orthogonal frequency division multiplexing (OFDM)) symbols, single carrier frequency division multiple access (SC-FDMA) symbol, and the like in the time domain. The slot may be a time unit based on numerology.

The slot may include a plurality of minislots. Each minislot may be composed of one or a plurality of symbols in the time domain. In addition, the minislot may be referred to as a sub-slot. The minislot may be configured with a smaller number of symbols than that of the slot. A PDSCH (or PUSCH) transmitted in a time unit larger than a minislot may be referred to as a PDSCH (or PUSCH) mapping type A. A PDSCH (or PUSCH) transmitted using a minislot may be referred to as a PDSCH (or PUSCH) mapping type B.

All of the radio frame, the subframe, the slot, the minislot, and the symbol represent time units at the time of transmitting a signal. The radio frame, the subframe, the slot, the minislot, and the symbol may have different names corresponding thereto, respectively.

For example, one subframe may be referred to as a transmission time interval (TTI), a plurality of consecutive subframes may be referred to as TTI, and one slot or one minislot may be referred to as TTI. That is, at least one of the subframe and the TTI may be a subframe (1 ms) in the existing LTE, a period (for example, 1 to 13 symbols) shorter than 1 ms, or a period longer than 1 ms. Note that a unit representing TTI may be called a slot, a minislot, or the like instead of a subframe.

Here, the TTI refers to, for example, a minimum time unit of scheduling in radio communication. For example, in the LTE system, the base station performs scheduling to allocate radio resources (frequency bandwidth, transmission power, and the like that can be used in each user terminal) to each user terminal in units of TTI. Note that the definition of the TTI is not limited thereto.

The TTI may be a transmission time unit such as a channel-encoded data packet (transport block), a code block, and a code word, or may also be a processing unit such as scheduling or link adaptation. Note that when the TTI is given, a time interval (for example, the number of symbols) in which the transport block, the code block, the code word, and the like are actually mapped may be shorter than the TTI.

Note that when one slot or one minislot is referred to as the TTI, one or more TTIs (that is, one or more slots or one or more minislots) may be the minimum time unit of the scheduling. Further, the number of slots (the number of minislots) constituting the minimum time unit of the scheduling may be controlled.

A TTI having a time length of 1 ms may be referred to as a normal TTI (TTI in LTE Rel. 8-12), a normal TTI, a long TTI, a normal subframe, a normal subframe, a long subframe, a slot, or the like. A TTI shorter than the normal TTI may be referred to as a shortened TTI, a short TTI, a partial TTI (partial or fractional TTI), a shortened subframe, a short subframe, a minislot, a subslot, a slot, and the like.

Note that the long TTI (for example, normal TTI, subframe, and the like) may be read as a TTI having a time length exceeding 1 ms, and the short TTI (for example, a shortened TTI) may be read as a TTI that is less than the long TTI and has a TTI length of 1 ms or more.

The resource block (RB) is a resource allocation unit in the time domain and the frequency domain, and may include one or a plurality of consecutive subcarriers in the frequency domain. The number of subcarriers included in the RB may be the same regardless of the numerology, for example, 12. The number of subcarriers included in the RB may be determined based on the numerology.

Further, the time domain of the RB may include one or a plurality of symbols, and may have a length of one slot, one minislot, one subframe, or one TTI. One TTI, one subframe, and the like each may be composed of one or a plurality of resource blocks.

Note that one or a plurality of RBs may be referred to as a physical resource block (physical RB: PRB), a sub-carrier group (SCG), a resource element group (REG), a PRB pair, an RB pair, and the like.

In addition, the resource block may be composed of one or a plurality of resource elements (RE). For example, 1 RE may be a radio resource region of one subcarrier and one symbol.

A bandwidth part (BWP) (may be called a partial bandwidth, and the like) may represent a subset of consecutive common resource blocks (RBs) for certain numerology in a certain carrier. Here, the common RB may be specified by an RB index based on a common reference point of the carrier. The PRB may be defined in a certain BWP and numbered within the BWP.

The BWP may include a UL BWP and a DL BWP. One or a plurality of BWPs may be configured in one carrier for the UE.

At least one of the configured BWPs may be active, and it may not be assumed that the UE transmits and receives a predetermined signal/channel outside the active BWP. Note that "cell", "carrier", and the like in this disclosure may be read as "BWP".

The structures of the radio frame, the subframe, the slot, the minislot, the symbol, and the like, described above are merely examples. For example, the configurations of the number of subframes included in a radio frame, the number of slots per subframe or radio frame, the number of minislots included in the slot, the number of symbols and RBs included in the slot or minislot, the number of subcarriers included in the RB, the number of symbols in the TTI, the symbol length, the cyclic prefix (CP) length, and the like can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as reference signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with a "unit", a "circuit" a, "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout this disclosure, for example, during translation, if articles such as "a", "an", and "the" in English are added, in this disclosure, these articles shall include plurality of nouns following these articles.

The term "determining" and "deciding" used in the present disclosure may include a wide variety of motions. The "determining" and "deciding" may include, for example, judging, calculating, computing, processing, deriving, investigating, looking up (search, inquiry) (for example, searching in a table, a database or another data structure), and may include ones regarding ascertaining as the "determining" and "deciding". In addition, the "determining" and "deciding" may include one regarding "receiving" (for example, receiving information), transmitting (for example, transmitting information), an input, an output, accessing (for example, accessing data in memory) as "determining" and "deciding". In addition, the "determining" and "deciding" may include ones regarding ones such as resolving, selecting, choosing, establishing, and comparing as "determining" and "deciding". That is, the "determining" and "deciding" can include considering some operation as performing the "determining" and "deciding". In addition, the "determining (deciding)" may be read as "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in this disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100A, 100B gNB
200 UE
210 Radio transmitting unit
220 Radio receiving unit
230 Handover control unit
240 CA control unit
250 Monitoring and measurement unit
1001 Processor
1002 Memory
1003 Storage
1004 Communication device
1005 Input device
1006 Output device
1007 BUS

The invention claimed is:

1. A terminal comprising:
   a transmitter that communicates with a first radio base station forming a transition source cell and a second radio base station forming a transition destination cell; and
   a processor that determines an interrupt time applied to communication performed by the transmitter on a transition from the transition source cell to the transition destination cell,
   wherein the processor changes a value of the interrupt time based on a combination of subcarrier spacings set in the transition source cell and the transition destination cell.

2. The terminal according to claim 1, wherein the processor changes the value of the interrupt time based on a combination of frequencies of the transition source cell and the transition destination cell and the subcarrier spacings.

3. A radio base station comprising:
   a transmitter that performs communication, to which an interrupt time applied, with a terminal that determines the interrupt time based on a combination of subcarrier spacings set in a transition source cell and a transition destination cell in a transition from the transition source cell to the transition destination cell.

4. A radio communication method comprising the steps of:
   a first step that a terminal communicates with a first radio base station forming a transition source cell and a second radio base station forming a transition destination cell; and
   a second step that the terminal determines an interrupt time applied to communication performed by the terminal on a transition from the transition source cell to the transition destination cell,
   wherein in the second step, the terminal changes a value of the interrupt time based on a combination of subcarrier spacings set in the transition source cell and the transition destination cell.

5. A radio communication system comprising a first radio base station forming a transition source cell, a second radio base station forming a transition destination cell, and a terminal, wherein
   the terminal comprises:
      a transmitter that communicates with the first radio base station forming the transition source cell and the second radio base station forming the transition destination cell; and
      a processor that determines an interrupt time applied to communication performed by the transmitter on a transition from the transition source cell to the transition destination cell,
      wherein the processor changes a value of the interrupt time based on a combination of subcarrier spacings set in the transition source cell and the transition destination cell.

* * * * *